A. E. McDONALD.
GEAR SHIFT LOCK.
APPLICATION FILED SEPT. 27, 1919.
1,347,110.
Patented July 20, 1920.
2 SHEETS—SHEET 2.
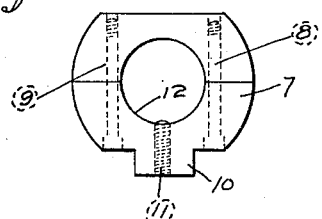
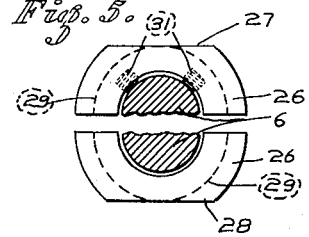
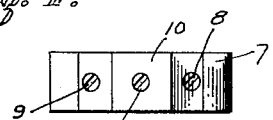
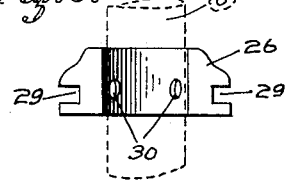
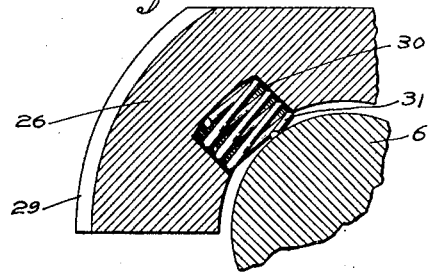
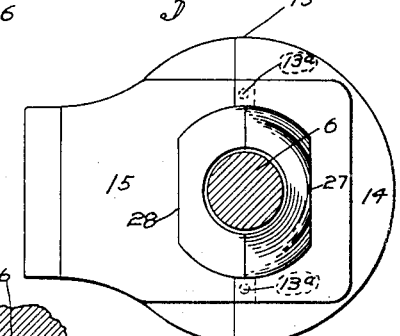
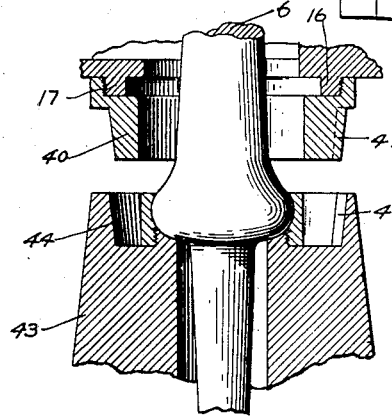
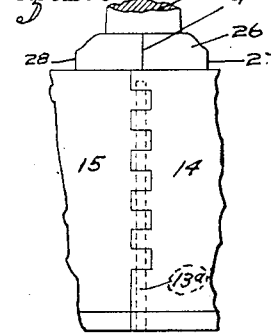
INVENTOR.
Arthur E. McDonald
BY Bradley L. Benson
ATTORNEY

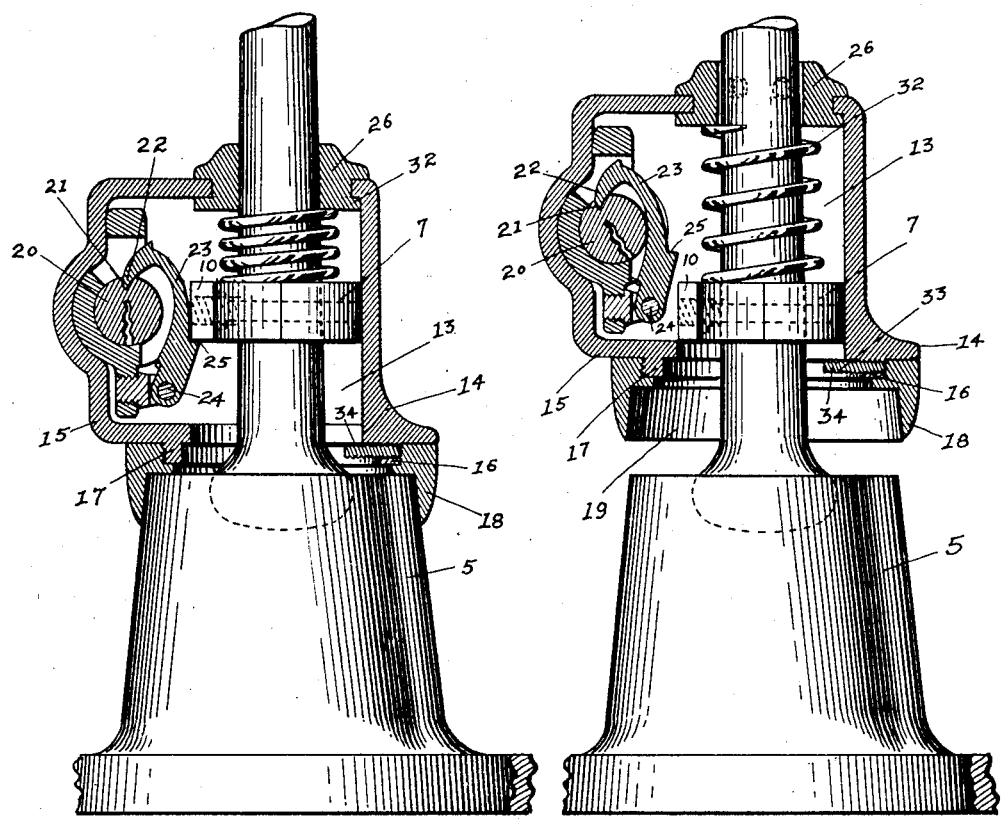

UNITED STATES PATENT OFFICE.

ARTHUR E. McDONALD, OF SAN FRANCISCO, CALIFORNIA.

GEAR-SHIFT LOCK.

1,347,110.  Specification of Letters Patent.  Patented July 20, 1920.

Application filed September 27, 1919. Serial No. 327,350.

*To all whom it may concern:*

Be it known that I, ARTHUR E. McDONALD, a citizen of the United States, residing at San Francisco, in the county of San Francisco and State of California, have invented certain new and useful Improvements in Gear-Shift Locks, of which the following is a specification.

This invention relates to an automobile lock of that type designed to be employed upon the shifting lever which operates the gears.

The principal object of this invention is to provide a gear shifting mechanism which is simple in operation and effective against tampering.

Another object of this invention is to provide a lock mechanism which is self-contained, and which may be applied to any make of car without the necessity of altering the car in any manner whatsoever.

Another object of this invention is to provide a lock mechanism which cannot be removed after the same has been placed in a locked position.

Other objects and advantages will be seen as the description proceeds.

In this specification and the annexed drawings, the invention is illustrated in the form considered to be the best, but it is to be understood that the invention is not limited to such form, because it may be embodied in other forms, and it is also to be understood that in and by the claims following the description it is desired to cover the invention in whatsoever form it may be embodied.

In the drawings:—

Figure 1 is a plan view of my device partly in section and in locked position.

Fig. 2 is similar to Fig. 1 with the exception that the device is in an unlocked position.

Figs. 3, 4 and 5 are detail views of the lever clamp.

Figs. 6 and 7 are detail views of a sliding bushing.

Fig. 8 is a modified form of the locking member.

Fig. 9 is a top plan view of my device as placed around a gear shift lever shown in cross section.

Fig. 10 is a fragmentary view showing the method of connecting the two sections of my casing.

The numeral 5 designates the usual upstanding collar adjacent the lower end of the gear shifting lever here designated as 6. Attached to the lever 6, I provide a clamp 7, which clamp 7 is made of two sections, as best shown in Figs. 3 and 5. These sections are joined by screws 8 and 9. One of the sections is provided with an offset 10, which offset carries a screw 11 which has its inner end projecting into the opening 12, which opening should be of the same diameter as the rod 6 at the point where the clamp 7 is to be applied. This screw 11 contacts with the lever 6 and thereby rigidly attaches the clamp to said lever.

Surrounding this clamp, I provide a casing 13. This casing is preferably made in two sections which sections may be fastened together in any well known manner. By referring to Figs. 9 and 10, it will be seen that the sections 14 and 15 of the casing 13 are joined together by pins 13ª, and by referring to Fig. 10 in part it will be seen that the sections 14 and 15 have a dovetail connection, and that the pin 13ª passes through these connections, and is inserted upwardly. By placing the ring 18 upon the casing 13, as hereinafter mentioned it will be seen that the pins 13ª cannot be withdrawn.

In the present illustration, I have shown two sections 14 and 15 and provided with depending semi-circular parts 16 and 17, which depending parts are externally threaded and held together by an internally screw threaded ring 18. This ring also has a further function that is, below the screw threaded portion I provide a smooth face 19, which face corresponds with the contour of the member 5, the purpose of which will be hereinafter described.

In the member 15, I mount a lock mechanism, which lock mechanism is designated by the numeral 20. This is preferably a barrel lock, commonly termed "pin" lock, and has a notch 21 upon its periphery. This notch engages the nose 22 of a hook shaped member 23 which is pivoted at 24 and carries a latch 25 adapted to engage the underside of the projecting member 10 of the clamp 7.

Surrounding the lever 6 and forming a bushing between the same and the casing 13, I provide a split member 26 which member has flat side portions 27 and 28. The curved portions are slotted as at 29 to engage the upper edge of the casing 13. I provide spring recesses 30 in these members 26 adapted to retain the springs 31 which springs contact with the lever 6 and prevent any rattling which might occur when the casing and collar 26 are moved to the position shown in Fig. 2; it being well known that substantially all gear shift levers taper and consequently are smaller toward their upper end which would result in rattling if the springs were not provided. I provide a heavy coiled spring 32 surrounding the shift lever, and having its lower end bearing against the clamp 7 and its upper end against the bushing 26. This tends to keep the casing and parts attached thereto in the position shown in Fig. 2 except when the casing is pushed downwardly and locked as shown in Fig. 1.

At 33 is shown a screw which passes through the depending semi-circular part 16 and presses against the thread carried on the member 18. This acts to prevent removal of the member 18, and at the same time is of such length as to form a stop by contacting at the point 34 with the underside of the clamp 7.

Fig. 8 discloses a modified form of a lock wherein the ring 40 is substituted for the ring 18, and threaded upon the semi-circular parts 16 and 17. This ring 40 is provided upon one side with a slot 41 adapted to receive a key 42 integral with the upstanding collar 43. This upstanding collar is similar to the collar 5, with the exception that a depressed ring 44 is formed adjacent the swivel connection of the shifting lever 6.

By this construction, it will be seen that the same lock is established between the upstanding portion and the shifting lever as in the form previously described, it being understood that an inside connection is made in the place of an outside connection.

Having thus described my invention what I claim as new and desire to secure by Letters Patent of the United States is as follows:—

1. In a lock, the combination of a gear shift lever, a fixed part supporting said lever, a collar surrounding said lever and attached thereto at a point near said fixed support, a spring surrounding said lever and abutting said collar, a movable casing surrounding a portion of said lever adjacent said support, said casing also surrounding said collar and said spring, a bushing carried by said casing and contacting with said spring, a ring attached to said casing and adapted to engage said support when said casing is forced downward against the tension of said spring, and means for holding said ring against said support and against the tension of said spring.

2. In a lock, the combination of a pivoted lever, a rigid support adjacent the pivot point of said lever, a collar fixed on said lever, a casing surrounding a portion of said lever and said collar, said casing being made of sections, said sections being dovetailed, pins passing through said dovetailed portions, a bushing carried by the upper portion of said casing, said bushing surrounding said lever and having an aperture similar to that of the cross sectional area of the lever, a spring surrounding said lever and bearing on said collar and said bushing a ring attached to the lower portion of said casing, and means for holding said ring in contact with said support.

3. In a lock, the combination of a pivoted lever, a rigid support adjacent the pivot point of said lever, a collar fixed on said lever, a casing surrounding a portion of said lever and said collar, said casing being made of sections, said sections being dovetailed, pins passing through said dovetailed portions, a bushing carried by the upper portion of said casing, said bushing surrounding said lever and having an aperture similar to that of the cross sectional area of the lever, a spring surrounding said lever and bearing on said collar and said bushing a ring attached to the lower portion of said casing, said ring serving to prevent withdrawal of said pins from said dovetail connection, and a latch for holding said casing in a fixed position relative to said lever.

4. In a lock, the combination of a pivoted lever, a fixed support for said pivoted lever, a collar rigidly attached to said lever, and at a point near said support, a spring surrounding said lever and supported on said collar, a bushing surrounding said lever and supported on said spring, a casing formed of sections surrounding said spring and said collar and engaging said bushing, the sections of said casing being dovetailed one to the other and held in engagement with each other through the medium of pins having their lower ends pointing downwardly, a ring carried by the lower portion of said casing, said ring serving to prevent the withdrawal of said pins, a latch mounted in one section of said casing, and means for actuating said latch through the medium of a key.

In testimony whereof I affix my signature.

ARTHUR E. McDONALD.